United States Patent [19]

Kimizu

[11] Patent Number: 5,053,606

[45] Date of Patent: Oct. 1, 1991

[54] CREDIT AUTHORIZATION TERMINAL WITH CIRCUITRY TO SERVICE PLURAL CUSTOMERS IN PARALLEL

[75] Inventor: Ryuichi Kimizu, Ootsu, Japan

[73] Assignee: Omron Tateisi Electronics Company, Kyoto, Japan

[21] Appl. No.: 202,667

[22] Filed: Jun. 6, 1988

[30] Foreign Application Priority Data

Jun. 8, 1987 [JP] Japan .................. 62-142595

[51] Int. Cl.$^5$ .............. G06F 15/21; G06F 13/00
[52] U.S. Cl. .................. 235/379; 235/380; 902/22; 902/39; 902/40
[58] Field of Search ........... 364/408; 235/379, 380; 902/22, 24, 40, 39

[56] References Cited

U.S. PATENT DOCUMENTS

| | | | |
|---|---|---|---|
| 4,186,871 | 2/1980 | Anderson et al. | 235/380 |
| 4,417,137 | 11/1983 | Lundblad | 235/379 |
| 4,660,168 | 4/1987 | Grant et al. | 235/379 X |
| 4,677,552 | 6/1987 | Sibley, Jr. | 902/39 X |
| 4,683,536 | 7/1987 | Yamamoto | 364/408 |
| 4,698,746 | 10/1987 | Goldstein | 364/200 |
| 4,843,547 | 6/1989 | Fuyama et al. | 364/405 |

FOREIGN PATENT DOCUMENTS

| | | |
|---|---|---|
| 0122344 | 10/1978 | Japan . |
| 0143080 | 11/1981 | Japan . |
| 0146372 | 8/1984 | Japan . |
| 0157666 | 8/1985 | Japan . |
| 0250759 | 12/1985 | Japan . |
| 0080731 | 4/1987 | Japan . |
| 2135493 | 8/1984 | United Kingdom . |

Primary Examiner—Clark A. Jablon
Attorney, Agent, or Firm—Dickstein, Shapiro & Morin

[57] ABSTRACT

A credit authorization terminal (CAT), when communication processing is performed between the CAT and a host computer to perform settlement processing for one customer, performs input processing of information concerning settlement for the next customer in parallel with the communication processing. The CAT can continuously perform input processing of information concerning settlement for a plurality of customers. The CAT continues to perform communication processing to perform settlement processing for one customer without hanging up a line between the CAT and the host computer, when communication processing is terminated for the previous customer.

9 Claims, 8 Drawing Sheets

FIG.11A  FIG.11B

# CREDIT AUTHORIZATION TERMINAL WITH CIRCUITRY TO SERVICE PLURAL CUSTOMERS IN PARALLEL

BACKGROUND OF THE INVENTION

1. Field of the Invention

The present invention relates generally to a terminal, and more particularly, to a terminal which can be connected to a host for performing information processing through a communication line and perform in parallel processing for inputting information to be processed and processing for transmitting information to a host.

2. Description of the Prior Art

In recent years, as a credit card has been widely used, a card authorization terminal referred to as a CAT (Credit Authorization Terminal) is put into practice to automate settlement processing with the credit card, or the like. The CAT has a communication function and can be connected to a host computer of a card company through a telephone line. The conventional CAT is provided with a card reader, a keyboard, a display, a printer and the like, to which a PIN pad is connected. The card reader is used for reading card data from the credit card. The keyboard is used for inputting a settlement amount of a customer. The display is used for displaying a guidance message for operation or the result of settlement. The printer is used for printing information concerning settlement. The PIN pad is used for customer's inputting his or her personal identity number.

Figure 1:
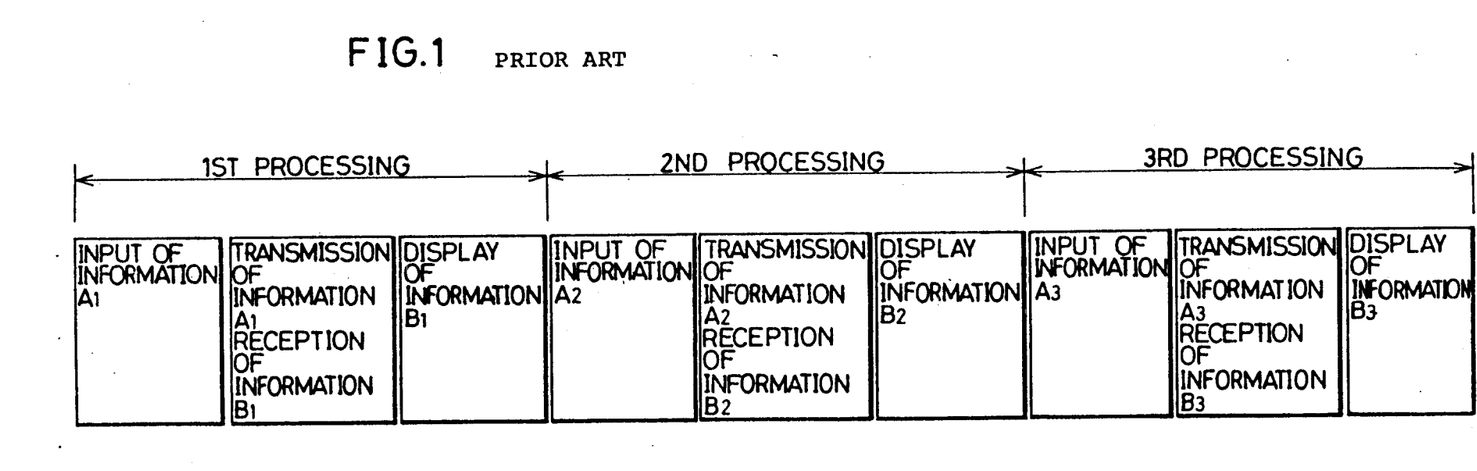
FIG. 1 is a timing chart showing an operation of a conventional CAT.

FIG. 1 is a timing chart of settlement processing performed by the conventional CAT. FIG. 1 shows a case in which settlement processing is performed for three customers. First, information a1 to be settled for one customer is inputted and stored, which information comprises card data, settlement amount data and personal identity number data. Then, a telephone number of the host computer is dialed, so that the host computer is called. Consequently, the information a1 is transmitted to the host computer. The host computer performs settlement processing based on the transmitted information a1, to obtain information b1 indicating the result of settlement. The obtained information b1 is transmitted to the CAT. The transmitted information b1 indicating the result of settlement is displayed on the display in the CAT. Consequently, settlement processing for one customer is terminated, whereby settlement information of the next customer can be inputted. The same processing as described above is performed for the next customer.

In the conventional CAT, as described above, the settlement information of one customer can not be inputted until the settlement processing for the previous customer is terminated, and thirty seconds or more are required for communication processing between the CAT and the host computer. Thus, one customer must wait for a long time until settlement processing for the previous customer is terminated.

SUMMARY OF THE INVENTION

An object of the present invention is to provide a terminal for performing information processing without any waiting time.

Another object of the present invention is to provide a terminal which can reduce the cost required for communication.

Still another object of the present invention is to provide a terminal for performing settlement processing without making a customer wait.

Briefly stated, the present invention is directed to a terminal including inputting means for inputting information to be processed, transmitting means for transmitting to a host the information inputted from the inputting means, and control means for allowing processing for inputting information by the inputting means in parallel with transmission processing of the transmitting means.

In accordance with another aspect of the present invention, the control means allows processing for inputting continuously a plurality of information by the inputting means in parallel with the transmission processing of the transmitting means.

In accordance with still another aspect of the present invention, the control means allows processing for transmitting one information by the transmitting means without hanging up a line between the terminal and the host when transmission of the previous information is terminated.

In accordance with still another aspect of the present invention, the transmitting means receives from the host the result of information processing performed by the host. In addition, the terminal includes outputting means for outputting the result of information processing. The control means allows the input processing of the inputting means and the output processing of the outputting means in parallel with transmission/reception processing of the transmitting means.

In accordance with still another aspect of the present invention, the terminal comprises inputting means for inputting information concerning settlement for each customer, transmitting means for transmitting to the host the information concerning settlement inputted from the inputting means, and control means allowing the input processing of the inputting means in parallel with the transmission processing of the transmitting means.

In accordance with still another aspect of the present invention, the transmitting means receives from the host information indicating the result of settlement. In addition, the terminal includes display means for displaying the information indicating the result of settlement received by the transmitting means. In parallel with transmission processing of the transmitting means to perform settlement processing for one customer, the control means allows processing for displaying on the display means information indicating the result of settlement for the previous customer. In accordance with still another aspect of the present invention, the terminal includes informing means for informing that there is information indicating the result of settlement which has not been displayed on the display means, and display commanding means for issuing a display command to the display means. The control means allows processing for displaying on the display means the information indicating the result of settlement in response to the command of the display commanding means.

In accordance with still another aspect of the present invention, the terminal includes storing means for storing the information concerning settlement inputted from the inputting means for each customer. The control means allows the input processing of the inputting means until a storage area of the information concerning settlement becomes full in the storing means, in parallel with the transmission processing of the transmitting means.

In accordance with still another aspect of the present invention, the control means allows processing for transmitting the information concerning settlement by the transmitting means without hanging up the line between the terminal and the host if information concerning settlement which has not been transmitted is stored in the storing means.

According to the present invention, input processing of information to be processed can be performed in parallel with transmission processing between the terminal and the host, and processing for inputting continuously a plurality of information to be processed can be performed, so that information processing can be performed without any waiting time. When transmission of one information is terminated, information to be next processed can be continuously transmitted without hanging up the line between the terminal and the host, so that communication efficiency is improved and communication cost can be reduced.

The terminal according to the present invention allows the input processing of the information concerning settlement in parallel with the transmission processing and can quickly permit display processing of the information indicating the result of settlement when it is received from the host, so that a customer does not made to wait for a long time. Thus, the terminal according to the present invention contributes to the improvement of service to customers as well as the improvement of the image of shops.

These objects and other objects, features, aspects and advantages of the present invention will become more apparent from the following detailed description of the present invention when taken in conjunction with the accompanying drawings.

DESCRIPTION OF THE PREFERRED EMBODIMENTS

The present invention can be applied to any terminal which can be connected to a host through a communication line. Description is now made on a settlement processing terminal as preferred embodiments.

First Embodiment

Figure 2:
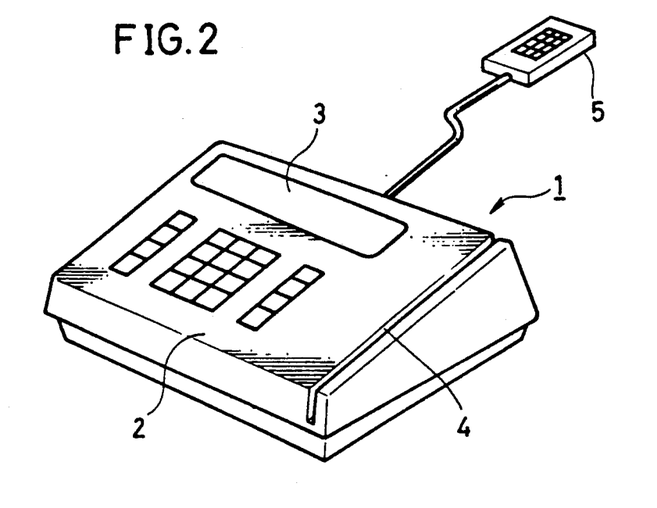
FIG. 2 is a perspective view showing the appearance of a CAT which are common to first and second embodiments of the present invention.
Figure 3:
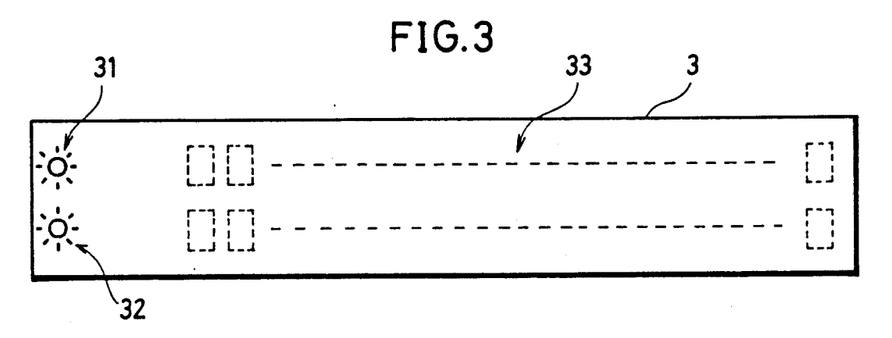
FIG. 3 is a diagram showing a display in the CAT shown in FIG. 2.
Figure 4:
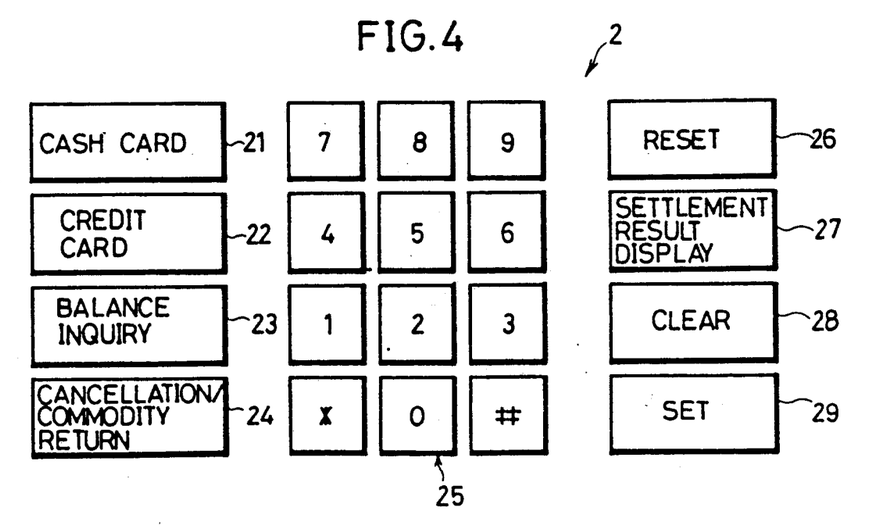
FIG. 4 is a key arrangement of the CAT shown in FIG. 2.
Figure 5:
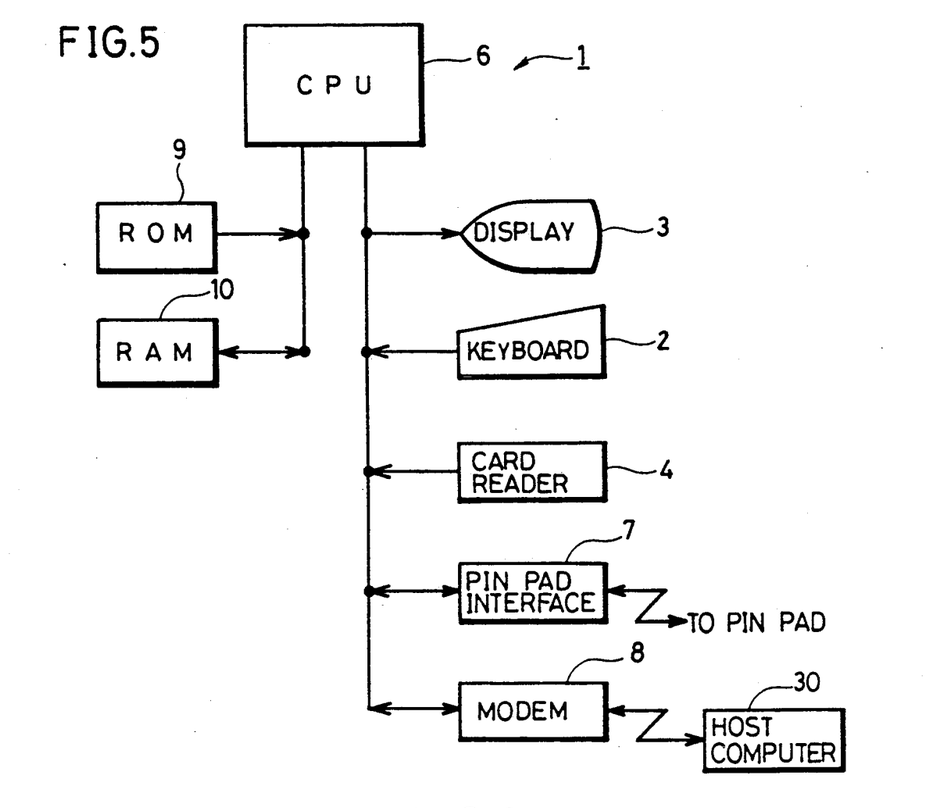
FIG. 5 is a schematic block diagram showing electrical structure of the CAT shown in FIG. 2.

FIG. 2 is a perspective view showing the appearance of a CAT according to an embodiment of the present invention, FIG. 3 is a diagram showing a display shown in FIG. 2, FIG. 4 is a diagram showing a key arrangement of a keyboard shown in FIG. 2, and FIG. 5 is a schematic block diagram showing electrical structure of the CAT shown in FIG. 2. Referring now to FIGS. 2 to 5, the structure of the CAT according to an embodiment of the present invention will be described.

As shown in FIG. 2, the main body of a CAT 1 is provided with a keyboard 2, a display 3, and a card reader 4, to which a PIN pad 5 is connected. As shown in FIG. 3, the display 3 is provided with an LED 31, and an LED 32 and a character display portion 33. The LED 31 is used for indicating that data transmission is made between the CAT 1 and a host computer 30, which is turned on for lighting during communication. The LED 32 is used for indicating that there exists information indicating the result of settlement which has not been displayed yet in the character display portion 33, which is turned on for lighting when there exists undisplayed information. The character display portion 33 is used for displaying a guidance message for operation, information concerning settlement to be settled and information indicating the result of settlement.

As shown in FIG. 4, the keyboard is provided with a cash card key 21, a credit card key 22, a balance inquiry key 23, a cancellation/commodity return key 24, a ten-key 25, a reset key 26, a settlement result display key 27, a clear key 28 and a set key 29. The cash card key 21 is used for commanding settlement processing with a cash card. The credit card key 22 is used for commanding settlement processing with a credit card. The balance inquiry key 23 is used for commanding an inquiry about the balance. The cancellation/commodity return key 24 is used for commanding the cancellation of a credit transaction and return commodities. The ten-key array 25 is used for inputting settlement amount data or the like. The reset key 26 is used for commanding a reset operation. The settlement result display key 27 is used for commanding a display on the display 3 of information indicating the result of settlement. The clear key 28 is used for commanding a clear memory. The set key 29 is used for commanding a in the content displayed on the display 3. The card reader 4 is used for reading card data from the cash card or the credit card. The PIN pad 5 is used for customer's inputting his or her personal identity number.

As shown in FIG. 5, the CAT 1 is provided with a CPU 6. The CPU 6 is connected to a PIN pad interface 7, an MODEM 8, a ROM 9 and a RAM 10, in addition to the above described keyboard 2, the display 3 and the card reader 4. The PIN pad interface 7 is used for making data transmission between the CPU 6 and a PIN pad 5, to which the PIN pad 5 is connected. The MODEM 8 is used for making data transmission between the CPU 6 and the host computer 30. An operation program of the CPU 6 is stored in the ROM 9. Information concerning settlement and information indicating the result of settlement are stored in the RAM 10.

Figure 6:
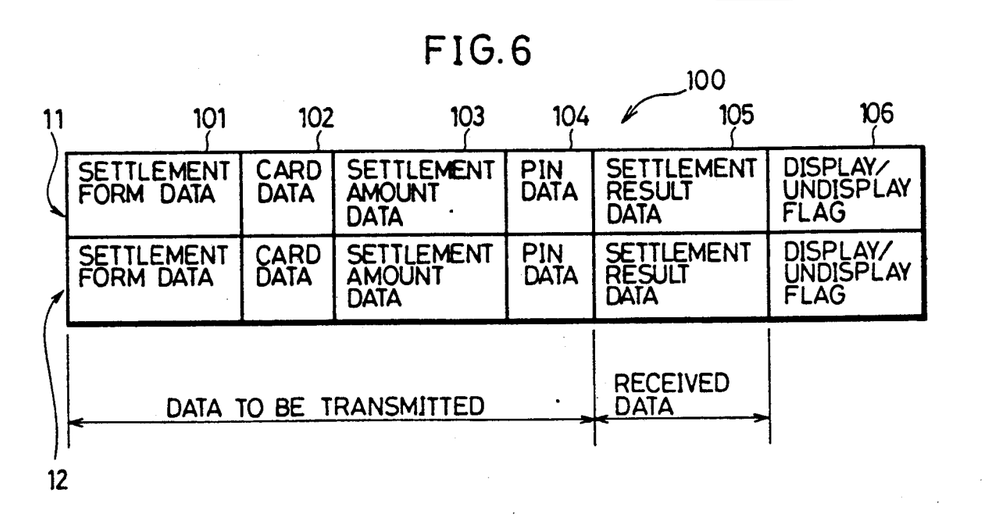
FIG. 6 is illustration showing a storage area in a RAM according to a first embodiment.

FIG. 6 shows a storage area in the RAM 10. In FIG. 6, the storage area 100 is provided with communication buffers 11 and 12 in order to store information concerning settlement for two customers. The communication buffers 11 and 12 are provided with areas 101 to 106. Settlement form data indicating whether settlement is performed with a cash card or a credit card is stored in the area 101. Card data read from the cash card or the credit card is stored in the area 102. Settlement amount data is stored in the area 103. PIN data (personal identity number data) is stored in the area 104. Settlement result data is stored in the area 105. A display/undisplay flag is stored in the area 106. The display/undisplay flag is used for indicating whether or not settlement result data is displayed on the display 3. The data stored in the areas 101 to 104 are data to be transmitted to the host computer 30 to perform settlement processing. The settlement result data stored in the area 105 is data transmitted from the host computer 30.

Figure 7:
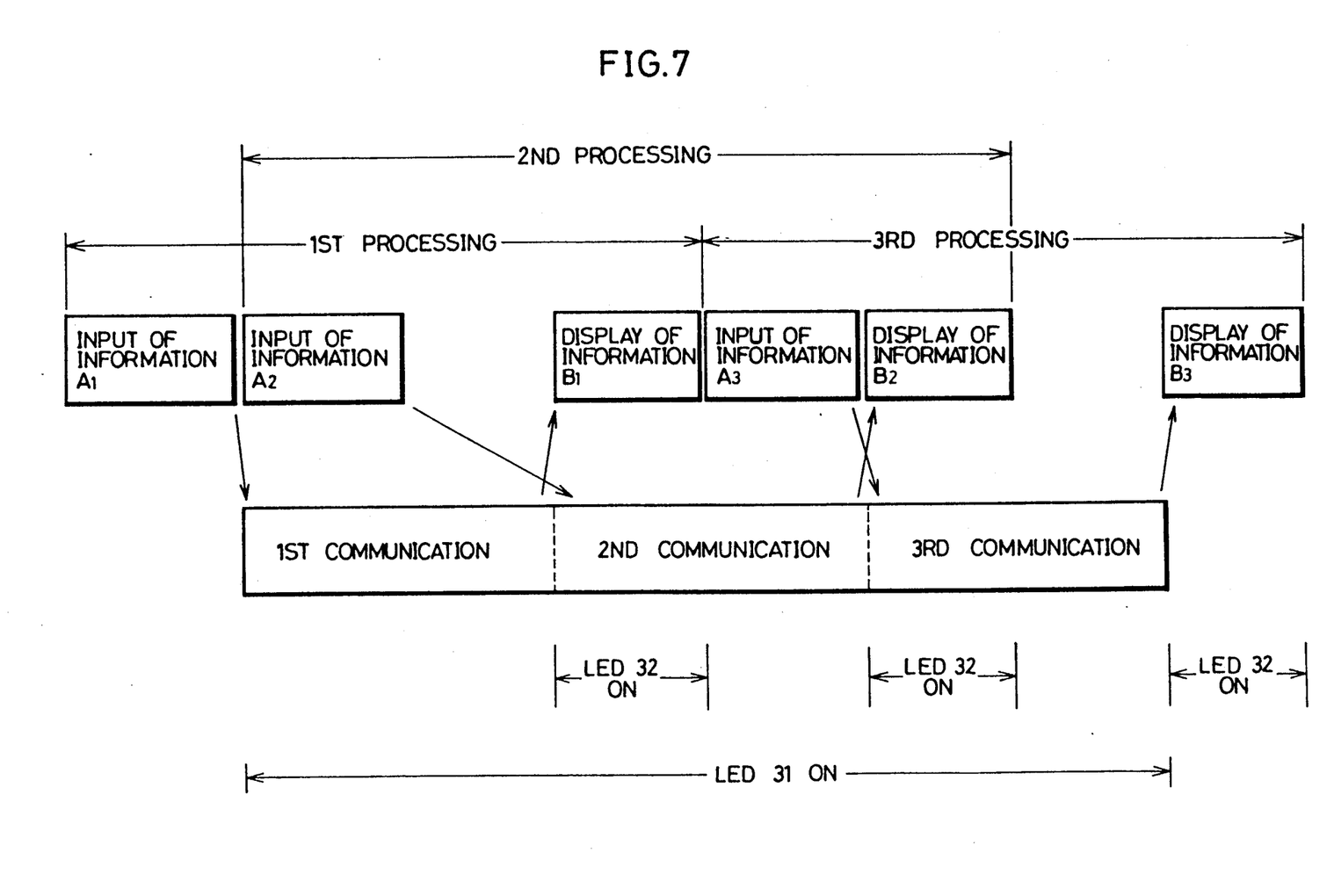
FIG. 7 is a timing chart according to the first embodiment.

FIG. 7 is a timing chart according to an embodiment of the present invention.

Figure 8A:
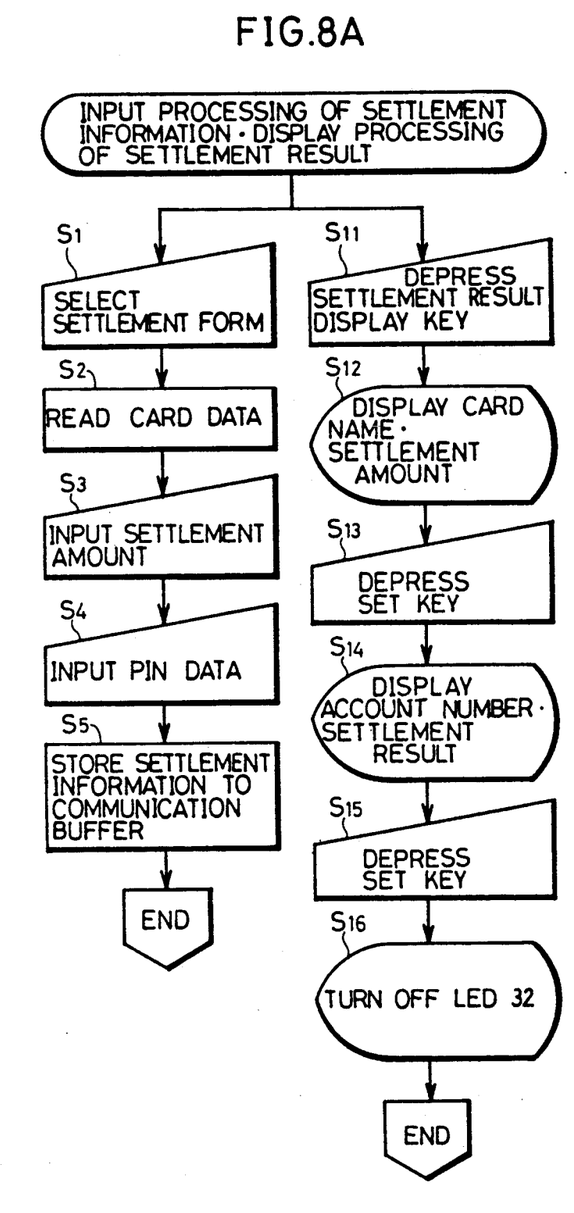
FIGS. 8A and 8B are flow charts for explaining an operation of the first embodiment.
Figure 8B:
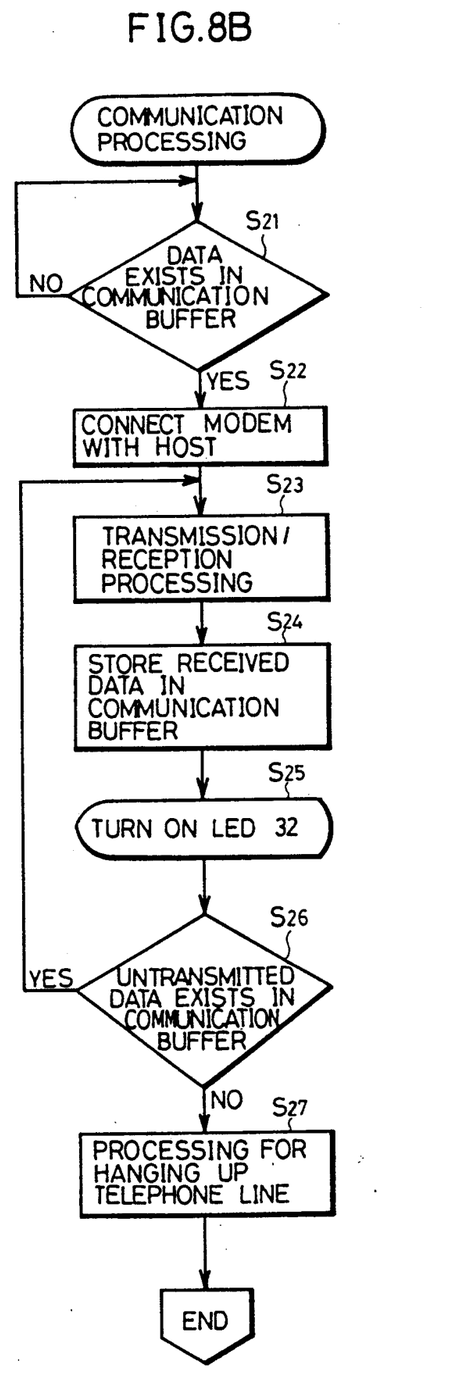

FIGS. 8A and 8B are flow charts for explaining an operation according to an embodiment of the present invention, where FIG. 8A shows input processing of information concerning settlement and display processing of information indicating the result of settlement, and FIG. 8B shows communication processing.

Referring now to FIGS. 2 to 8B, the operation according to an embodiment of the present invention will be described. In the present embodiment, the CPU 6 performs multitask processing based on a program stored in the ROM 9, so that the input processing of information concerning settlement, the communication processing and the display processing of the result of settlement are performed in parallel.

When an operator performs continuously settlement processing for a plurality of customers, the operator first inputs information concerning settlement for the first customer. More specifically, the operator first designates the form of settlement, i.e., immediate settlement processing with the cash card, credit processing with the credit card or the like (in the step S 1). The designation is achieved by operating the cash card key 21 or the credit card key 22. Then, the operator inserts a card into the card reader 4. The card reader 4 reads card data from the inserted card (in the step S 2). Then, the operator operates the ten-key array 25 to input a settlement amount (in the step S 3). Then, a customer operates the PIN pad 5 to input the PIN data (in the step S 4). The CPU 6 stores the inputted information concerning settlement in the communication buffer 11 in the RAM 10 (in the step S 5). The above described input processing corresponds to input processing of information a1 in first processing shown in FIG. 7.

The CPU 6 determines whether or not information concerning settlement is stored in the communication buffer 11 (in the step S 21). When the information concerning settlement is stored, the CPU 6 connects the MODEM 8 with the host computer 30 through a telephone line by dialing (in the step S22). The CPU 6 then reads the information concerning settlement from the communication buffer 11, to transmit the same to the host computer 30 (in the step S 23). The host computer 30 performs settlement processing based on the transmitted information concerning settlement. The host computer 30 debits a customer's account for the amount to be settled when the cash card is used while registering the amount to be settled on a file when the credit card is used. The host computer 30 may be employed both for the cash card and the credit card. Alternately, the host computer 30 for the cash card and the host computer 30 for the credit card may be separately provided. The host computer 30 transmits to the CAT 1 the obtained information b1 indicating the result of settlement. The CPU 6 in the CAT 1 is responsive to the reception of the information b1 for indicating the result of settlement for storing the information b1 in the communication buffer 11 (in the step S 24). Then, the CPU 6 turns the LED 32 on for lighting in order to indicate that information indicating the result of settlement which has not been displayed yet is stored in the communication buffer 11 (in the step S 25), as well as sets the undisplay flag in the area 106 in the communication buffer 11. The above described communication processing corresponds to first communication processing in the first processing shown in FIG. 7. The CPU 6 determines whether or not information concerning settlement which has not been transmitted to the host computer 30 exists in the communication buffers 11 and 12 (in the step S 26). In general, when unprocessed data exists, communication processing of the data is performed (in the steps S 23 to 25). On the other hand, when unprocessed data does not exist, processing for hanging up a telephone line is performed (in the step S 27). In this case, since the information concerning settlement is stored in the communication buffer 12 during the first communication processing as described below, the program proceeds from the step S 26 to the step S 23.

Since the CAT 1 has a multitask function, the operator which finished inputting the information concerning settlement for the first customer can input information concerning settlement for the next customer during the communication processing for the first customer. The input processing for the second customer corresponds to input processing of information a2 in second processing shown in FIG. 7. Since data has already been stored in the communication buffer 11, the inputted information concerning settlement is stored in the communication buffer 12. When inputting of the information concerning settlement for the second customer is terminated, the operator waits until the communication processing for the first customer is terminated, confirms that the LED 32 in the display 3 is turned on for lighting, and commands to display the result of settlement (in the step S 11). This command is achieved by operating the settlement result display key 27. The CPU 6 is responsive to the operation of the settlement result display key 27 for reading out data from the communication buffer 11 having the undisplay flag set therein to display the same on the display 3. The CPU 6 allows display a card company name data included in the card data and a settlement amount as the first display data (in the step S 12), and allows displaying an account number included in the card data and the result of settlement in response to the operation of the set key 29 (in the steps S 13 to S 14). Then, the CPU 6 is responsive to the operation of the set key 29 for turning off the LED 32 (in the steps S 15 to S 16), to set the display flag in the area 106 in the communication buffer 11. The display processing of the result of settlement corresponds to display processing of the information b1 indicating the result of settlement in the first processing shown in FIG. 7. Data in the buffer area having the display flag set therein is replaced by information concerning settlement for the next customer when it is inputted.

Since the information concerning settlement for the second customer is inputted during the communication processing for the first customer, second communication processing for the second customer is performed without hanging up the line after the first communication processing for the first customer is terminated, as shown in FIG. 7. In addition, when the second communication processing for the second customer is performed, information concerning settlement for a third customer is inputted, so that third communication processing for the third customer is performed subsequently to the second communication processing for the second customer.

Meanwhile, the CPU 6 turns the LED 31 on for lighting during the time period from the time when the line between the CAT 1 and the host computer 30 is connected to the time when the line is hung up.

Second Embodiment

Structure of a CAT according to a second embodiment is the same as that according to the first embodiment shown in FIGS. 2 to 5.

Figure 9:
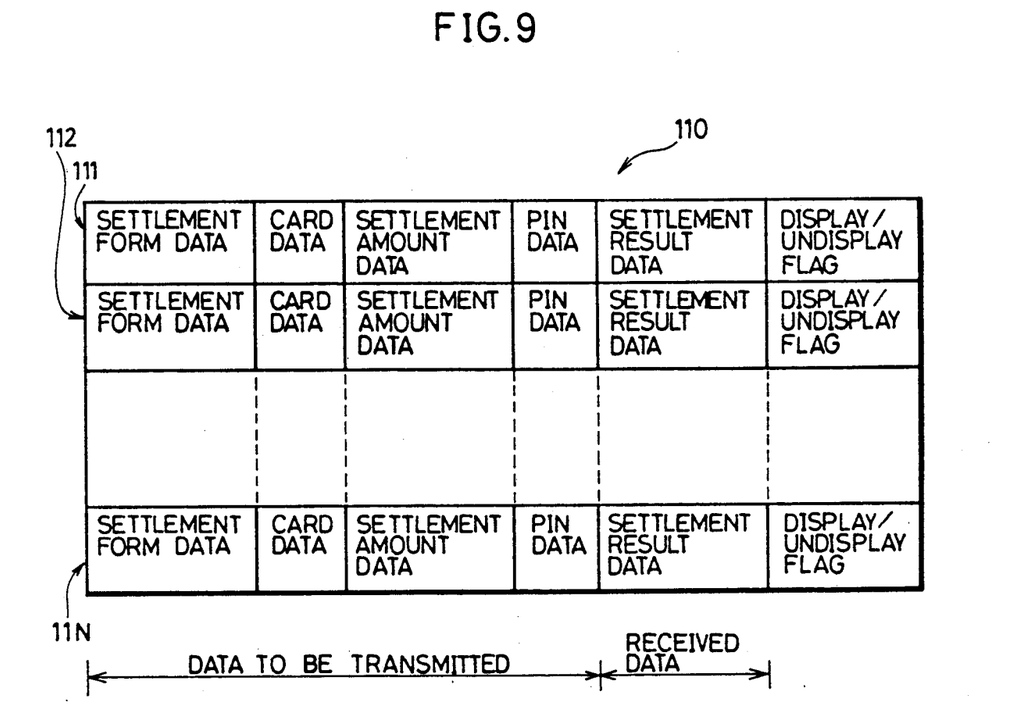
FIG. 9 is illustration showing a storage area in a RAM according to the second embodiment.

FIG. 9 shows a storage area in a RAM 10. As shown in FIG. 9, according to the present embodiment, a storage area 110 is provided with N communication buffers 111 to 11N. Settlement form data, card data, settlement amount data, PIN data, settlement result data and display/undisplay flag are stored in the communication buffers, respectively, as in the communication buffers shown in FIG. 6.

Figure 10:
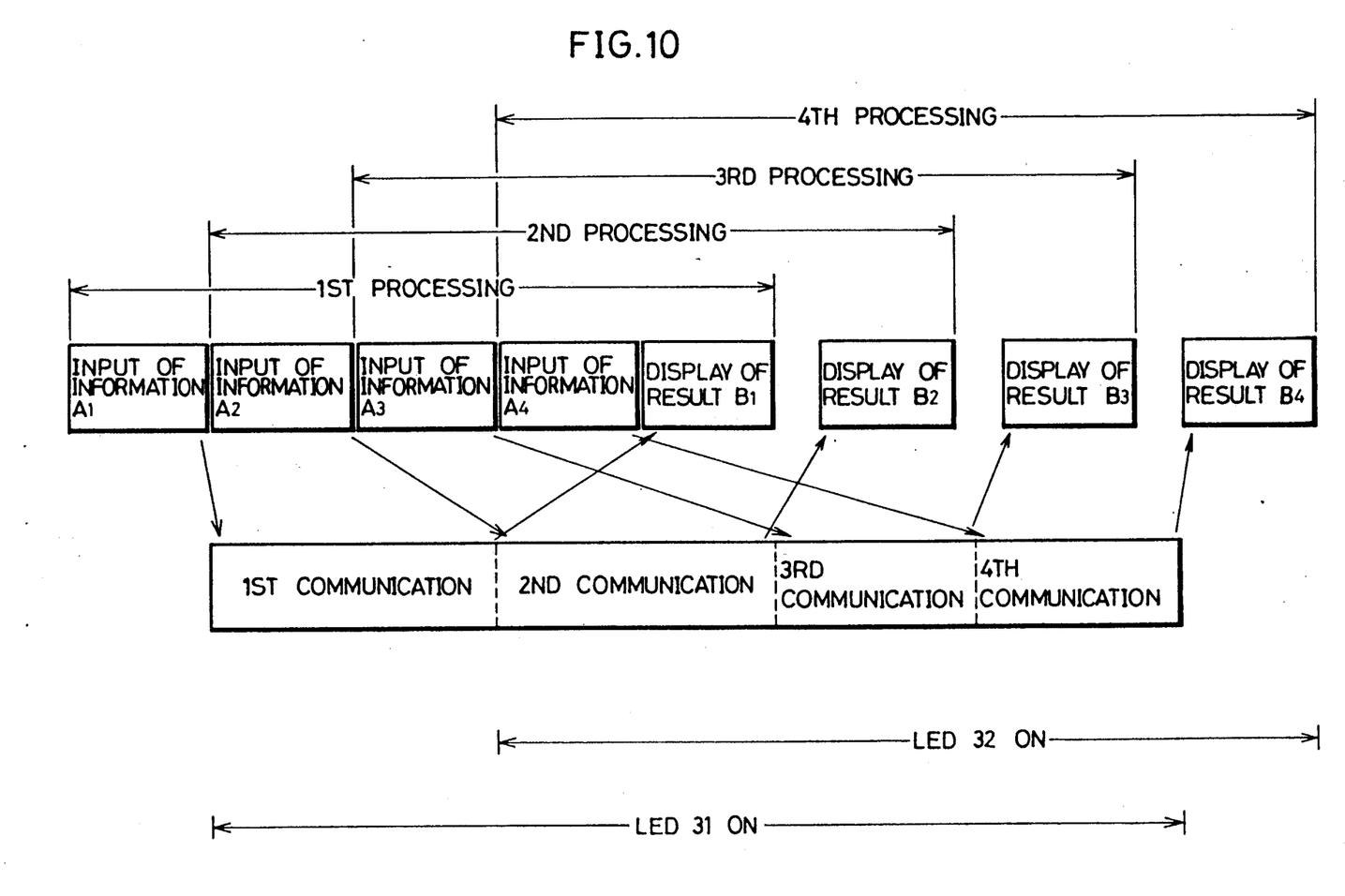
FIG. 10 is a timing chart according to the second embodiment.
Figure 11A:
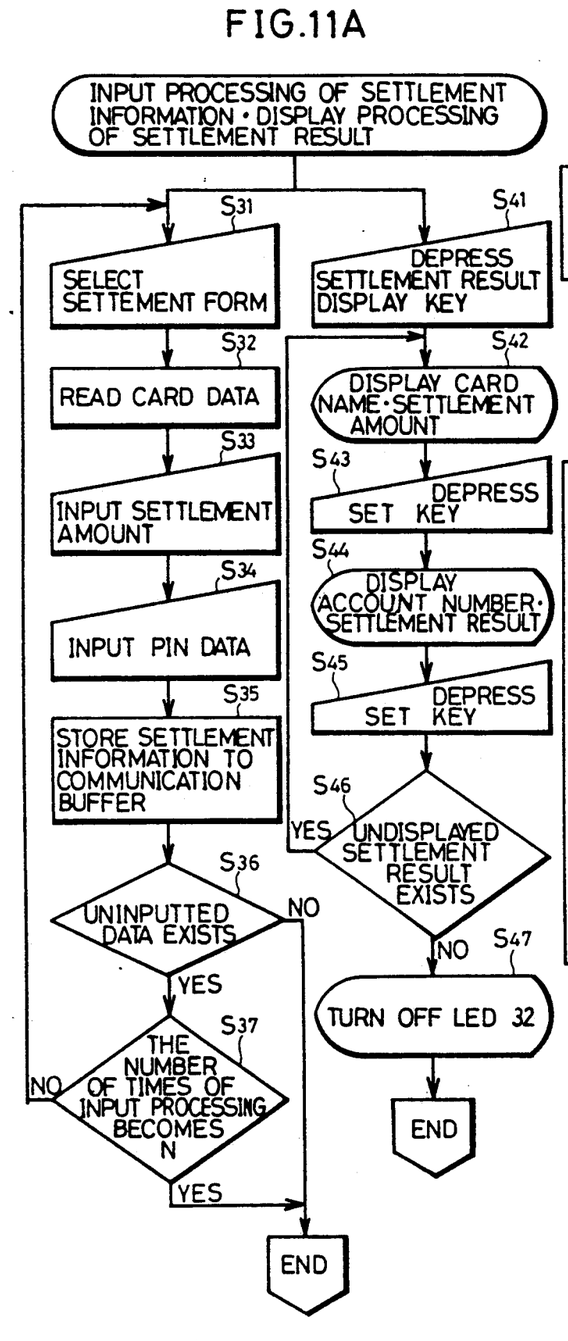
FIGS. 11A and 11B are flow charts for explaining an operation according to the second embodiment.
Figure 11B:
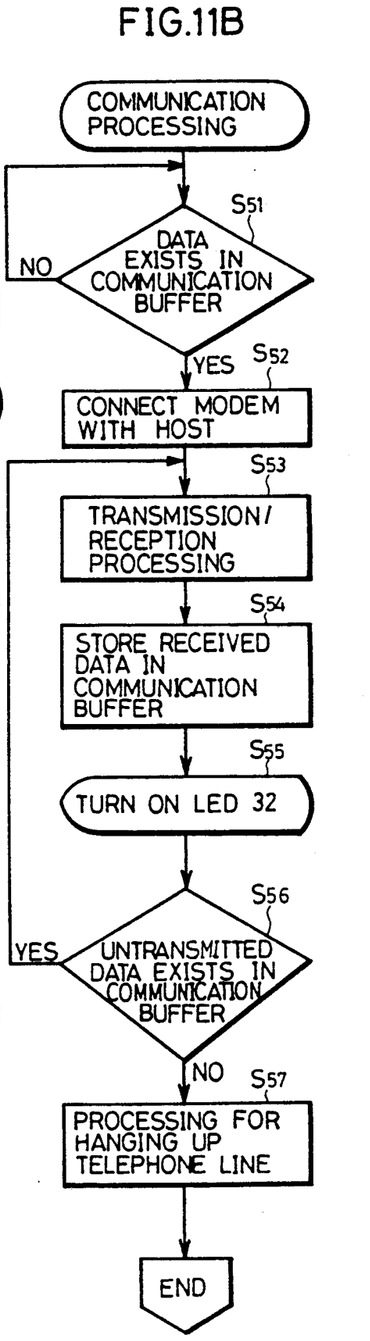

FIG. 10 is a timing chart according to the present embodiment. FIGS. 11A to 11B are flow charts for explaining an operation according to the present embodiment, where FIG. 11A shows input processing of information concerning settlement and display processing of the result of settlement, and FIG. 11B shows communication processing. Referring now to FIGS. 2 to 5 and FIGS. 9 to 11B, the operation according to the present embodiment will be described. In the same manner as described in the first embodiment, input processing of information concerning settlement is performed for a first customer (in the steps S 31 to S 34). The inputted information concerning settlement is stored in the communication buffer 111 (in the step S 35). An operator determines whether or not there exists information concerning settlement which has not been inputted yet (in the step S 36). When there exists information concerning settlement which has not been inputted yet, the information concerning settlement is inputted subsequently to the input processing for the first customer. The number of times of input processing of the information concerning settlement is restricted by the number of communication buffers. The CPU 6 determines whether or not the number of times of input processing of the information concerning settlement is N (in the step S 37). When the number of times of input processing becomes N, the communication buffer becomes full, so that an input operation is terminated.

According to the present embodiment, input processing is continuously performed for, for example, four customers. The input processing corresponds to input processing of information a1 in first processing, input processing of information a2 in second processing, input processing of information a3 in third processing and input processing of information a4 in fourth processing shown in FIG. 10. The CPU 6 determines whether or not information concerning settlement is stored in any of the communication buffers (in the step S 51). When the information concerning settlement is stored, communication processing is performed in the same manner as described in the first embodiment (in the steps S 53 to S 57). The communication processing corresponds to first communication processing, second communication processing, third communication processing and fourth communication processing shown in FIG. 10. The CPU 6 turns the LED 32 on for lighting when first communication processing is terminated.

The operator operates the settlement result display key 27 to display the result of settlement on the display 3 when the input processing is terminated for, for example, four customers (in the step S 41). The CPU 6 reads out information concerning settlement and information indicating the result of settlement from the communication buffer 110, to display the same on the display 3, in the same manner as described in the first embodiment (in the steps S 42 to S45). According to the present embodiment, the CPU 6 determines whether or not there exists information indicating the result of settlement which has not been displayed yet every time the CPU 6 displays data from one communication buffer (in the step S 46), and turns the LED 32 off when display processing of all information indicating the result of settlement is terminated (in the step S 47). It is determined based on the display/undisplay flag stored in each of the communication buffers whether or not there exists information indicating the result of settlement which has not been displayed yet. The display processing of the information indicating the result of settlement corresponds to display processing of the result b1 of settlement, display processing of the result b2 of settlement, display processing of the result b3 of settlement and display processing of the result b4 of settlement shown in FIG. 10.

Meanwhile, the CPU 6 turns the LED 31 on for lighting while communication processing is performed.

According to the present embodiment, input processing of information concerning settlement can be continuously performed for a plurality of customers during communication between the CAT 1 and the host computer 30.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A single data processing terminal for connecting to a host for performing settlement processing through a communication line, comprising:

inputting means for entering data into the single data processing terminal, the inputting means being operative to sequentially input settlement information relating to at least a first customer and a second customer, storing means, connected to the inputting means, having a storage area for storing settlement information for each of the first customer and the second customer inputted from said inputting means, transmitting means, connected to the storing means, for transmitting the settlement information to the host, and control means, connected to the inputting means, the storing means and the transmitting means, and operative to cause information input processing of the settlement information relating to either one of the first customer and the second customer by the inputting means until the storage area in the storing means becomes full, and to cause transmission processing of the settlement information relating to the other of either one of the first customer or the second customer to be sent in parallel at the same time by the transmitting means to the host.

2. A single data processing terminal according to claim 1, wherein the control means further comprises means for transmitting the settlement information by way of the transmitting means without disconnecting a phone line between the terminal and the host if the storing means contains settlement information that has not been transmitted to the host.

3. A single data processing terminal for connection to a host for performing information processing through a communication line, comprising:

inputting means for entering data into the single data processing terminal, the inputting means being operative to sequentially input information to be processed relating to at least a first customer and a second customer, transmitting means, connected to said inputting means, for transmitting to the host the information that is sequentially input from the inputting means, and control means connected to the inputting means and the transmitting means, and operative to cause input processing of the information relating to either one of the first customer or the second customer by the inputting means in parallel with causing transmission processing in which input information relating to the other one of the first customer or the second customer by is transmitted by the transmitting means to the host.

4. A single data processing terminal according to claim 3, wherein the inputting means is operative to further sequentially input information relating to at least a third customer, and said control means is operative to cause the inputting means to perform input processing of the information relating to two of the first customer, the second customer and the third customer in parallel with transmission processing in which input information relating to the remaining one of the first customer, the second customer or third customer is transmitted by the transmitting means to the host.

5. A single data processing terminal according to claim 3, wherein the control means causes transmission processing of information subsequently input by one of the customers by having the transmitting means transmit the information without disconnecting a phone line between the terminal and the host when terminating the transmitting of prior input information for another one of the customers using the transmitting means.

6. A single data processing terminal for connection to a host for performing information processing through a communication line, comprising:

inputting means for entering data into the single data processing terminal, the inputting means being operative to sequentially input information to be processed, transmitting means, connected to the inputting means, for transmitting the information inputted from the inputting means to the host and for receiving a result of information processing based on the transmitted information from the host, outputting means for outputting the result of information processing received by the transmitting means from the host, and control means, connected to the inputting means, the transmitting means and the outputting means, and operative to cause information input processing of the information input by the inputting means and output processing of the result of information processing output by the outputting means in parallel with transmission processing of the information inputted by the inputting means to the transmitting means and reception processing of the result of information processing received from the host.

7. A single data processing terminal for connection to a host for performing settlement processing through a communication line, comprising:

inputting means for entering data into the single data processing terminal, the inputting means being operative to sequentially input settlement information relating to at least a first customer and a second customer, transmitting means, connected to the inputting means, for transmitting the settlement information to the host, and control means, connected to the inputting means and the transmitting means, and operative to cause information input processing of the settlement information relating to either one of the first customer and the second customer in parallel with transmission processing in which input information relating to the other of the first customer or the second customer is transmitted by the transmitting means to the host.

8. A single data processing terminal according to claim 7, wherein the transmitting means receives information indicating the result of settlement from the host; the single data processing terminal further comprising a display means for displaying the settlement information received by the transmitting means; and wherein, in parallel with the transmission processing of the transmitting means to perform settlement processing for either one of the first or second customer, the control means displays on the display means the settlement information of a previous customer.

9. A single data processing terminal according to claim 7, which further comprises, informing means, connected to said control means, for informing that there exists settlement information which has not been displayed on the display means, and display commanding means for issuing a display command to the display means, the control means further comprising means for displaying on the display means settlement information in response to the display command.

* * * * *